UNITED STATES PATENT OFFICE.

FREDRICK TROXEL, OF DANVILLE, ILLINOIS, ASSIGNOR TO NORVAL D. CRIM, OF ANDERSON, INDIANA.

INCRUSTATION PREVENTIVE.

SPECIFICATION forming part of Letters Patent No. 295,309, dated March 18, 1884.

Application filed August 31, 1883. (No specimens.)

*To all whom it may concern:*

Be it known that I, FREDRICK TROXEL, of the city of Danville, county of Vermilion, and State of Illinois, have invented certain new and useful Improvements in Incrustation Preventives, of which the following is a specification.

The object of my said invention is to produce a mixture or compound for cleaning steam-boilers of scale and extracting lime from the water therein; and it consists in a preparation composed of the ingredients, used in substantially the proportions, hereinafter specified, to wit: common wood ashes, one hundred parts; "Louis's lye," sixteen parts; common rosin, two parts; alum, one part. These several ingredients should be pulverized and thoroughly mixed, and are preferably put up in dry form.

In use I place the mixture in the boiler, where it acts, in connection with the water therein, to remove all scale from the inside of the boiler, and precipitate the lime in said water, so that it can be easily removed. The amount of the preparation to be used of course depends upon the size of the boiler. For an ordinary locomotive-boiler about one and one-half pound is an effective amount, and for larger or smaller boilers a greater or less amount should be used.

The ashes may be omitted, and the preparation put up in liquid form, if desired. In this case, to prepare an amount involving one hundred quarts of water, the following would be the amounts used in the compound, viz: water, one hundred quarts; Louis's lye, sixteen pounds; rosin, two pounds; alum, one pound. This liquid compound is to be used in the same way as the dry compound, and a quart of the liquid is considered an equivalent of a pound of the dry compound.

Louis's lye is a prepared or concentrated lye, commonly known to the trade, and is prepared and sold by a manufacturer whose name it bears.

I am aware that the ingredients herein named are not separately new for the purpose specified, but, as combined, I am not aware that they have ever before been used.

Having thus fully described my said invention, what I claim as new, and desire to secure by Letters Patent, is—

A preparation or compound for extracting lime from water and removing scale from boilers, composed of concentrated lye, rosin, and alum, in substantially the proportions above set forth.

In witness whereof I have hereunto set my hand and seal at Danville, Illinois, this 27th day of August, A. D. 1883.

FREDRICK TROXEL. [L. S.]

Witnesses:
E. C. LOOMIS,
S. JAMES McKEE.